United States Patent
Shirasawa et al.

(10) Patent No.: US 7,032,218 B2
(45) Date of Patent: Apr. 18, 2006

(54) UPDATING METHOD OF FIRMWARE OF HARD DISK UNIT MOUNTED ON DISK ARRAY DEVICE AND DISK ARRAY DEVICE WITH FUNCTION FOR PERFORMING UPDATING METHOD

(75) Inventors: Manabu Shirasawa, Yao (JP); Mikio Fukuoka, Matsuda (JP); Takao Satoh, Odawara (JP)

(73) Assignee: Hitachi, Ltd., Tokyo (JP)

( * ) Notice: Subject to any disclaimer, the term of this patent is extended or adjusted under 35 U.S.C. 154(b) by 584 days.

(21) Appl. No.: 10/106,090

(22) Filed: Mar. 25, 2002

(65) Prior Publication Data

US 2002/0166027 A1 Nov. 7, 2002

(30) Foreign Application Priority Data

Apr. 20, 2001 (JP) .............................. 2001-123122

(51) Int. Cl.
*G06F 9/44* (2006.01)
(52) U.S. Cl. .................... 717/168; 717/169; 711/114
(58) Field of Classification Search ........ 717/168–173, 717/124; 711/101, 102, 105, 114, 162, 170, 711/110
See application file for complete search history.

(56) References Cited

U.S. PATENT DOCUMENTS

| | | | | |
|---|---|---|---|---|
| 4,430,727 A | * | 2/1984 | Moore et al. .................. 711/115 |
| 5,008,814 A | * | 4/1991 | Mathur ......................... 709/221 |
| 5,297,257 A | * | 3/1994 | Struger et al. ................. 700/83 |
| 5,297,258 A | * | 3/1994 | Hale et al. .................... 711/114 |
| 5,502,836 A | * | 3/1996 | Hale et al. .................... 711/170 |
| 5,535,355 A | * | 7/1996 | Scales .......................... 711/101 |
| 5,603,056 A | * | 2/1997 | Totani ............................ 710/8 |
| 5,835,933 A | * | 11/1998 | Wells et al. .................. 711/103 |
| 5,960,445 A | * | 9/1999 | Tamori et al. ............... 707/203 |
| 6,032,269 A | * | 2/2000 | Renner, Jr. ..................... 714/37 |
| 6,144,992 A | * | 11/2000 | Turpin et al. ................ 709/208 |
| 6,157,983 A | * | 12/2000 | Lee et al. .................... 711/103 |
| 6,175,919 B1 | * | 1/2001 | Ha .............................. 713/100 |
| 6,179,492 B1 | * | 1/2001 | Guy et al. ................... 717/169 |
| 6,324,692 B1 | * | 11/2001 | Fiske .......................... 717/171 |
| 6,467,087 B1 | * | 10/2002 | Yang .......................... 717/168 |
| 6,484,235 B1 | * | 11/2002 | Horst et al. ................. 711/114 |
| 6,487,633 B1 | * | 11/2002 | Horst et al. ................. 711/112 |
| 6,487,718 B1 | * | 11/2002 | Rodriguez et al. .......... 717/177 |
| 6,604,235 B1 | * | 8/2003 | Harrison et al. ............ 717/168 |
| 6,609,177 B1 | * | 8/2003 | Schlumberger et al. ..... 711/122 |
| 6,640,334 B1 | * | 10/2003 | Rasmussen .................. 717/171 |

(Continued)

OTHER PUBLICATIONS

Hou et al, "Comparing rebuild algorithms for mirrored and RAID disk arrays", ACM SIGMOD, pp 317-326, 1993.*

(Continued)

*Primary Examiner*—Anil Khatri
(74) *Attorney, Agent, or Firm*—Townsend and Townsend and Crew LLP

(57) ABSTRACT

Data recorded in a disk of a hard disk unit is copied to another hard disk unit. A proxy mode, for making the other hard disk unit which has been copied with the data to perform an I/O process to the hard disk unit in place thereof, is performed. Meanwhile, the firmware of the original hard disk unit is updated, and contents of the disk is set up to a latest updated state. Then, the operation in the proxy mode is stopped, and the operation is switched to an operation in a normal mode where the I/O process is directly performed to the original hard disk unit.

16 Claims, 6 Drawing Sheets

U.S. PATENT DOCUMENTS

| | | | |
|---|---|---|---|
| 6,681,390 B1 * | 1/2004 | Fiske | 717/173 |
| 6,698,017 B1 * | 2/2004 | Adamovits et al. | 717/168 |
| 6,721,612 B1 * | 4/2004 | Aramaki et al. | 700/87 |
| 6,775,794 B1 * | 8/2004 | Horst et al. | 714/42 |
| 6,836,859 B1 * | 12/2004 | Berg et al. | 714/36 |
| 6,944,854 B1 * | 9/2005 | Kehne et al. | 717/168 |
| 6,948,164 B1 * | 9/2005 | Tinker | 717/168 |
| 2001/0044934 A1 * | 11/2001 | Hirai et al. | 717/11 |
| 2002/0042892 A1 * | 4/2002 | Gold | 714/6 |
| 2002/0066092 A1 * | 5/2002 | Liu | 717/168 |
| 2002/0092008 A1 * | 7/2002 | Kehne et al. | 717/168 |
| 2002/0133747 A1 * | 9/2002 | Ravid | 714/20 |
| 2002/0170050 A1 * | 11/2002 | Fiorella et al. | 717/168 |

OTHER PUBLICATIONS

Varma et al, "Destage algorithm for disk arrays with non volatile caches", ACM ISCA, pp 83-95, 1995.*

Stodolsky et al, "Parity logging overcoming the samll write problem in redundant disk arrays", IEEE, pp 64-75, 1993.*

Wilkes et al, "The HP autoRAID hierarchical storage system", ACM Trans on Computer Sys, vol. 14, No. 1, pp 108-136, 1996.*

* cited by examiner

| ID | UPDATE NECESSITY | UPDATE-WHILE-ON FUNCTION | UPDATE DATA | UPDATE STATUS | OPERATING MODE | | |
|---|---|---|---|---|---|---|---|
| | | | | | RAID | RAID LEVEL | RAID ID |
| 1 | YES | NO | a1 | FINISHED | YES | 0 | 1 |
| 2 | YES | NO | a1 | FINISHED | YES | 0 | 1 |
| 3 | NO | NO | a1 | — | YES | 5 | 2 |
| 4 | NO | NO | a1 | — | YES | 5 | 2 |
| 5 | YES | NO | b1 | UNFINISHED | YES | 5 | 2 |
| 6 | YES | NO | b1 | UNFINISHED | YES | 5 | 2 |
| 7 | YES | YES | b2 | UNFINISHED | YES | 5 | 3 |
| 8 | YES | YES | b2 | UNFINISHED | YES | 5 | 3 |
| 9 | YES | YES | b2 | UNFINISHED | YES | 5 | 3 |
| 10 | YES | YES | c1 | — | YES | 5 | 3 |
| 11 | YES | YES | c1 | — | YES | — | — |
| 12 | NO | YES | c1 | — | NO | — | — |
| 13 | NO | YES | c1 | — | NO | — | — |
| 14 | NO | YES | c1 | — | NO | — | — |
| 15 | NO | YES | c1 | — | NO | — | — |
| 16 | NO | YES | | | | | |

FIG. 6

UPDATING METHOD OF FIRMWARE OF HARD DISK UNIT MOUNTED ON DISK ARRAY DEVICE AND DISK ARRAY DEVICE WITH FUNCTION FOR PERFORMING UPDATING METHOD

BACKGROUND OF THE INVENTION

The present application claims priority upon Japanese Patent Application No. 2001-123122 filed on Apr. 20, 2001 which is herein incorporated by reference.

1. Field of the Invention

The present invention relates to a disk array device, and particularly relates to a technique for updating contents of firmware of a hard disk unit mounted on a disk array device without interrupting operation of the disk array device.

2. Description of the Related Art

A disk array device is a data storage for performing storage of data, which is received from a host computer such as a personal computer, an office computer, or a mainframe connected via a certain communication means such as a LAN, under high reliability and high availability by a RAID mechanism structured by the hard disk units and/or various security functions. With the recent development of IT-related industries, there is an increasing need for disk array devices in many areas as a large-capacity storage of an open system, and further as a component of a SAN (Storage Area Network) or the like such as in a data center.

FIG. 1 is a schematic block diagram of a recent, typical disk array device. The disk array device is constructed of, for example, a communication interface 11 such as a LAN for communicating with host devices 2 such as a personal computer, an office computer, or a mainframe, a CPU 12 for executing and controlling, for example, the control of various parts, the RAID mechanism, and various security functions and/or various maintenance processes of the disk array device, various memory groups 13 for example, a RAM or a ROM, a disk control circuit 14 comprising an interface circuit of such as IDE or SCSI, and a plurality of hard disk units 15 mounted in the device and connected to the disk control circuit 14.

As shown in FIG. 2, the hard disk unit 15 mounted on the disk array device is constructed by comprising, for example, a mechanical section 21 commonly known as an HDA (hard disk assembly) constructed by a spindle motor, a disk body, and a head performing reading and writing of data, and an electronic circuit section 29 referred to as a PCB (printed circuit board) mounted with various electronic circuits such as a mechanism control circuit 23 conducting various control of the mechanical section 21, a signal processing circuit 24 for performing receiving and handing of data signals to the mechanical section 21, an interface circuit 25 for connecting to an external apparatus (in this case, the disk control circuit 14), a CPU 26 for performing various control of the entire unit, a RAM 27 serves as a buffer memory and/or a cache memory, and a re-writable non-volatile memory 28 comprising for example a flash memory.

Here, the non-volatile memory 28 is recorded with the firmware for performing various control of the hard disk unit 15 such as the mechanical section and the electronic circuit section. Also, this firmware has a character of being appropriately updated for various reasons, such as, homogenizing of ability of each of the hard disk units 15 performed in aim to increase process speed and decrease error occurrence frequency when RAID is in operation, in version updating, or bug fixing.

By the way, the updating of the firmware is generally performed by a method of transmitting update data for the firmware from the disk array device to the hard disk unit 15. However generally, since the firmware is software which handles the central functions of the hard disk unit 15, during the firmware update, the function of the hard disk unit 15 must be temporarily interrupted. Further, after the update of the firmware, a so-called rebooting (resetting) process is necessary. This rebooting process (that is, from when the rebooting order was given until the hard disk unit 15 starts to operate by the new firmware) requires approximately several tens of second. Moreover, since this period of time is a length which exceeds the time-out value set in the disk array device, the operation of the disk array device is also interrupted by the rebooting operation, and in particular, the update of the firmware of the disk array device in operation will temporarily interrupt a client's business.

Thus, in order to solve the above problem, the present inventors developed a hard disk unit having a function to perform an update of firmware without interrupting a data-reading-and-writing process (hereinafter, referred to as "update-while-ON function"), and have already produced a disk array device which may perform firmware updating without interrupting the operation of the disk array device by structuring all the hard disk units to be mounted with the hard disk units having the update-while-ON function.

However, the number of disk array devices having such a function is still few at present. Further, from various reasons such as problems in design, in view of production, and in regarding cost, disk array devices comprising hard disk units 15 not having the update-while-ON function are thought to be continually utilized hereafter in many circumstances and places. Thus, the development of a mechanism, which updates firmware without interrupting operation of a disk array device even without the update-while-ON function, is still expected.

SUMMARY OF THE INVENTION

The present invention is made in view of the above matters, and an object is to provide an updating method of firmware of a hard disk unit mounted on a disk array device, which may update the firmware without interrupting operation of a disk array device.

In order to achieve the object, a first aspect of the present invention is an updating method of firmware stored within a hard disk unit in a disk array device. This updating method is applicable to a disk array device which is mounted with a plurality of hard disk units, each of which comprising a mechanical section of including a disk and a head, and an electronic circuit section mounted with various control functions and signal process functions of the mechanical section and an external interface function of a predetermined standard, and which is structured to comprise means for storing data in said hard disk unit, said data being received from another device which is connected via a predetermined communication means such as a LAN. The updating method comprises:

a step for copying data recorded in a disk of a hard disk unit A, of which firmware is to be updated, to another hard disk unit B;

a step for stopping an I/O process performed to said hard disk unit A after said copying, and switching to an operation in a proxy mode in which said hard disk unit B performs the I/O process to the hard disk unit A in place of the hard disk unit A;

a history management step for storing a data-modification history due to said I/O process during operation in said proxy mode;

a step for updating the firmware of the hard disk unit A during operation in said proxy mode;

a step for operating the hard disk unit A with the firmware having been updated;

a step for setting up contents of the disk of the hard disk unit A, which has started operation with the new firmware, to a latest updated state by said modification history and data recorded in a disk of the hard disk unit A or B; and a step for stopping the operation in said proxy mode after completion of said set-up, and switching to an operation in a normal mode in which said I/O process is directly performed to the hard disk unit A.

Here, according to one aspect of the present invention, whilst updating the firmware of the hard disk unit A, since the I/O process to the hard disk unit A is performed in place thereof by another hard disk unit B, the firmware of the hard disk unit A may be updated without interrupting the operation of the disk array device.

Further, a second aspect of the present invention is an updating method, of firmware stored within a hard disk unit in a disk array device. The updating method is applicable to a disk array device which is mounted with a plurality of hard disk units, each of which comprising a mechanical section including a disk and a head, and an electronic circuit section mounted with various control functions and signal process functions of these mechanical section and an external interface function of a predetermined standard, and which is structured to comprise means for storing data with a mechanism of RAID 2 to 5 structured, by said hard disk units, said data being received from another device which is connected via a predetermined communication means such as a LAN. The updating method comprises:

a step for stopping an I/O process performed to a hard disk unit A of which firmware is to be updated, and switching the I/O process performed to the hard disk unit A to an operation in a proxy mode performed by utilizing data of the hard disk unit A restored by data-restoration information which is stored in one or more disks of another hard disk unit group B structuring a RAID together with the hard disk unit A;

a history management step for storing a data-modification history due to said I/O process during operation of said proxy mode;

a step for updating the firmware of the hard disk unit A during operation in said proxy mode;

a step for operating the hard disk unit A with the firmware having been updated;

a step for setting up contents of the disk of the hard disk unit A, which has started operation with the new firmware, to a latest updated state by said modification history and said data-restoration information; and a step for stopping the operation in said proxy mode after said set up is complete, and switching to an operation in a normal mode in which said I/O process is directly performed to the hard disk unit A.

Here, according to an aspect of the present invention, during the updating of the firmware of the hard disk unit A, since the I/O process to the hard disk unit A is to be performed by utilizing data of the hard disk unit A restored by the data-restoration information which is stored in disks of another hard disk unit group B which structures the RAID together with the hard disk unit A, the firmware of the hard disk unit A may be updated without interrupting the operation of the disk array device. Further, in this aspect of the present invention, since there is no need to copy the disk data of the hard disk unit A, of which the firmware is to be updated, to a different hard disk unit as in the first aspect of the present invention, the process load is small, the process time is also shortened, and the updating of firmware may be performed smoothly. Further, since copying is not necessary, it is possible to structure a simple software for performing an updating of firmware.

BRIEF DESCRIPTION OF THE DRAWINGS

For a more complete understanding of the present invention and the advantages thereof, reference is now made to the following description taken in conjunction with the accompanying drawings wherein:

FIG. 6 is a diagram showing an example of a management table referred to by update software in an updating method of firmware in Embodiment 3 of the present invention.

DESCRIPTION OF THE PREFERRED EMBODIMENTS

Figure 1:
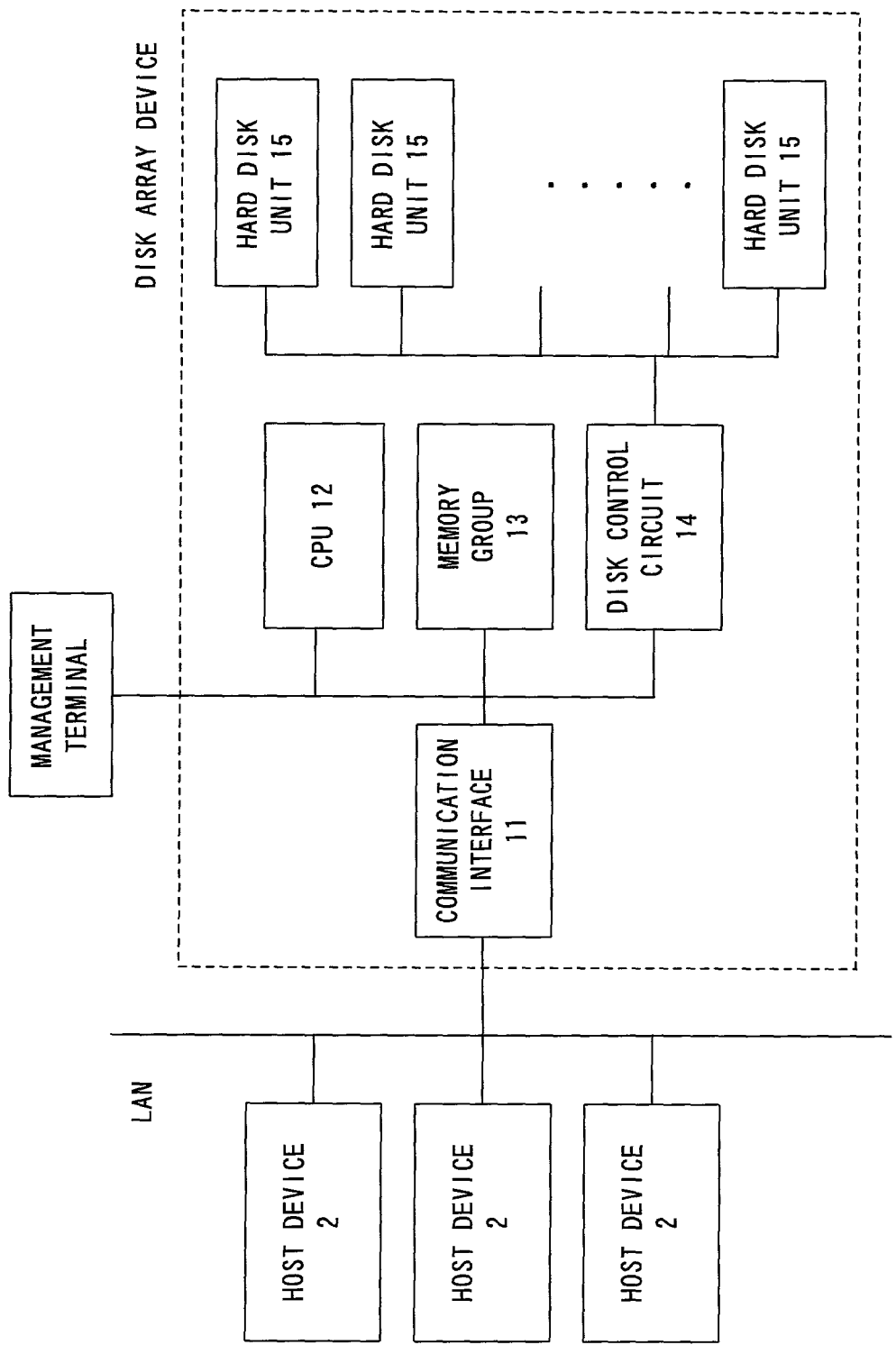
FIG. 1 is a diagram showing a schematic block structure of a disk array device in an embodiment of the present invention.
Figure 2:
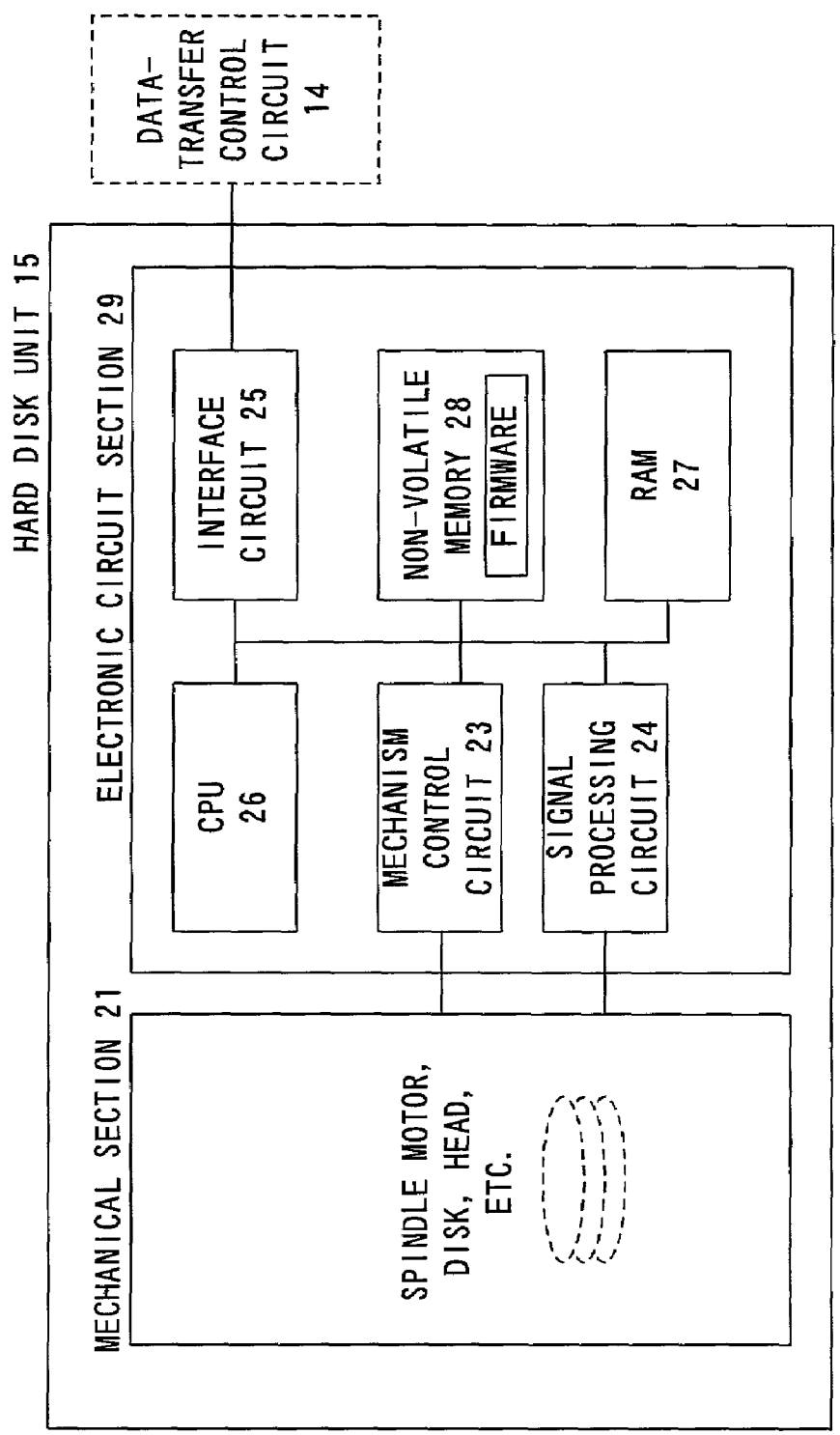
FIG. 2 is a diagram showing a schematic block structure of a hard disk unit in an embodiment of the present invention.

Hereinbelow, an updating method of firmware according to an embodiment of the present invention is described. Note that, the structure of the disk array device and hard disk units 15 in an embodiment as described below is similar to that shown in FIG. 1, and further, the updating method to be explained in this embodiment is performed by an updating program of firmware operating on the disk array device.

Figure 3:
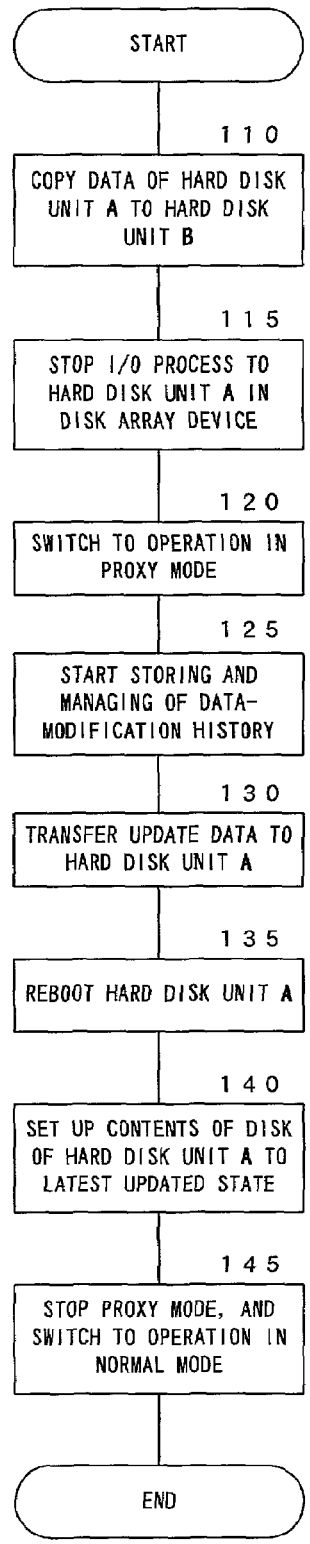
FIG. 3 is a diagram showing a flowchart explaining an updating method of firmware according to Embodiment 1 of the present invention.

FIG. 3 is a flowchart explaining an updating method in Embodiment 1 of the present invention. First, an updating program copies data recorded in a disk of a hard disk unit 15 (hereinafter, referred to as "hard disk unit A"), which is to be an update object, to another hard disk unit 15 (hereinafter referred to as "hard disk unit B") mounted on a disk array device (110). Next, when the copying is complete, the updating program stops the I/O process to the hard disk unit A in the disk array device (115), and switches to an operation in a proxy mode to make the hard disk unit B carry out the I/O process to the hard disk unit A in place of the hard disk unit A (120). Further, the updating program starts to store a data-modification history generated due to the I/O process as the operation in the proxy mode starts.

When it is confirmed in the above-mentioned manner that the hard disk unit A has stopped the I/O process and the operation in the proxy mode has started, then, the updating program transmits to the hard disk unit A the update data of the firmware which is supplied from a management terminal 17 of the disk array device and stored by a memory group 13 of the disk array device (130). Thereafter, a reboot order is sent to the hard disk unit A, and the hard disk unit A is operated by a new firmware (135).

When the hard disk unit A starts operation by a new firmware in the above-mentioned manner, next, the updating program sets up contents of a disk of the hard disk unit A to a newest updated state based on the above-mentioned data-modification history and data recorded in a disk of the hard disk unit A or B (140). Then, when this set up is complete, the updating program stops the operation in the proxy mode, and switches to an operation in a normal mode wherein the I/O process to the hard disk unit A is directly conducted to the hard disk unit A (145). With the above, the firmware-updating process of the hard disk unit A of Embodiment 1 is complete.

Note that, in Embodiment 1, the data of the hard disk unit A is copied to another hard disk unit B. In this case, the hard disk unit B, to which copying is performed, may be a hard disk unit prepared preliminarily, or a hard disk unit in operation of performing storage of data received from another device. Further, it may be a recording media other than a hard disk unit such as a semiconductor disk.

Figure 4:
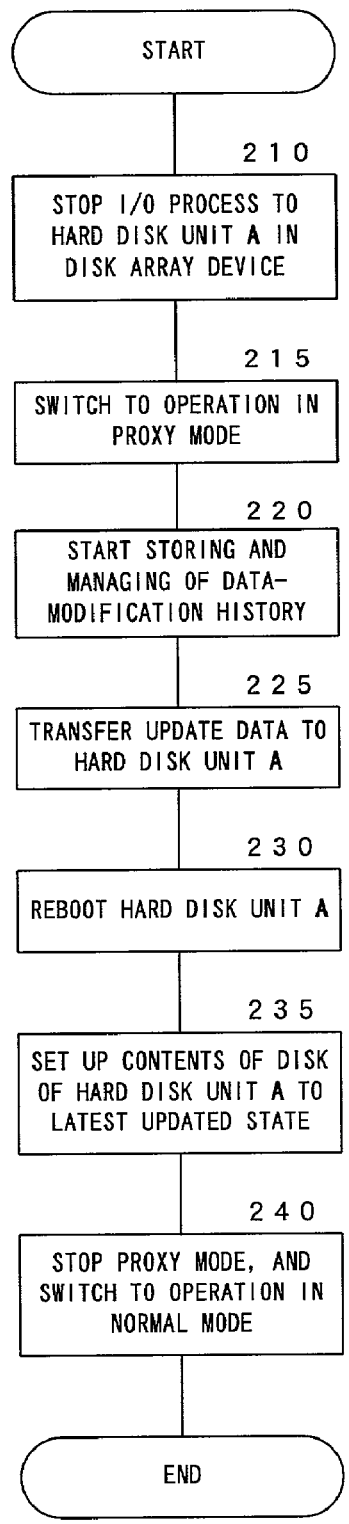
FIG. 4 is a diagram showing a flowchart explaining an updating method of firmware according to Embodiment 2 of the present invention.

On the other hand, FIG. 4 shows a flowchart explaining the updating method of Embodiment 2 of the present invention. In the updating method of Embodiment 2, different to the case as in Embodiment 1, a RAID mechanism performed by the disk array device is utilized. In this way, the updating of the firmware may be performed without interrupting the function of the disk array device and without having to copy the data of the hard disk unit A as in Embodiment 1.

As shown in FIG. 4, with this updating method, first, the updating program stops the I/O process performed to the hard disk unit A (210), and along therewith, switches the operation of the disk array device to an operation in a proxy mode (215). In this proxy mode, data of the hard disk unit group A is restored by data-restoration information which is stored in a disk of another hard disk unit group B which structures the RAID together with the hard disk unit A, and this data is used for performing the I/O process of the hard disk unit A. Here, data-restoration information is, for example, information written in an error correcting code such as a hamming code when the RAID level is RAID 2, and further, for example, it is information that is so-called parity codes when the RAID level is RAID 3 to 5. Further, similarly to the case of Embodiment 1, with the start of the operation in the proxy mode, the updating program starts the storage of data-modification history generated due to the I/O process (220).

As above, when it is confirmed that the hard disk unit A has stopped the I/O process and the operation in the proxy mode has started, next, as in Embodiment 1, the updating program transmits the update data for the firmware, which is supplied from the management terminal 17 and is stored in a memory group 13 of the disk array device, to the hard disk unit A (225), thereafter sends a reboot order to the hard disk unit A, and operates the hard disk unit A by a new firmware (230).

When the hard disk unit A starts its operation by the new firmware in the above-mentioned manner, next, the updating program sets up the contents of the disk of the hard disk unit A to a latest updated state based on the data-modification history, and the contents of the hard disk unit A or the data-restoration information recorded in a disk of the hard disk unit group B (235). Then, when this set up is completed, the updating program stops the operation in the proxy mode, and switches to an operation in the normal mode where the I/O input to the hard disk unit A is directly performed to the hard disk unit A (240). With the above, the updating process of the firmware of the hard disk unit A according to Embodiment 2 is complete.

By the way, it is thought that updating of the firmware of the hard disk units 15 mounted on the disk array device is performed not to just one particular hard disk unit 15, but more often to a plurality of hard disk units 15 all at once by a process in one sequence activated by one instruction command of an operator or a scheduler. Further, the updating method varies according to a model and an operating mode of the hard disk unit 15 mounted on the disk array device, such as whether or not the hard disk unit has the above-mentioned update-while-ON function, and whether or not the hard disk unit structures a RAID. Thus, when performing updating of firmware of a plurality of hard disk units 15 in one sequence as above, it is preferable, from the view of process efficiency, that an updating method is appropriately selected according to the model or the operating mode of the hard disk units.

Figure 5:
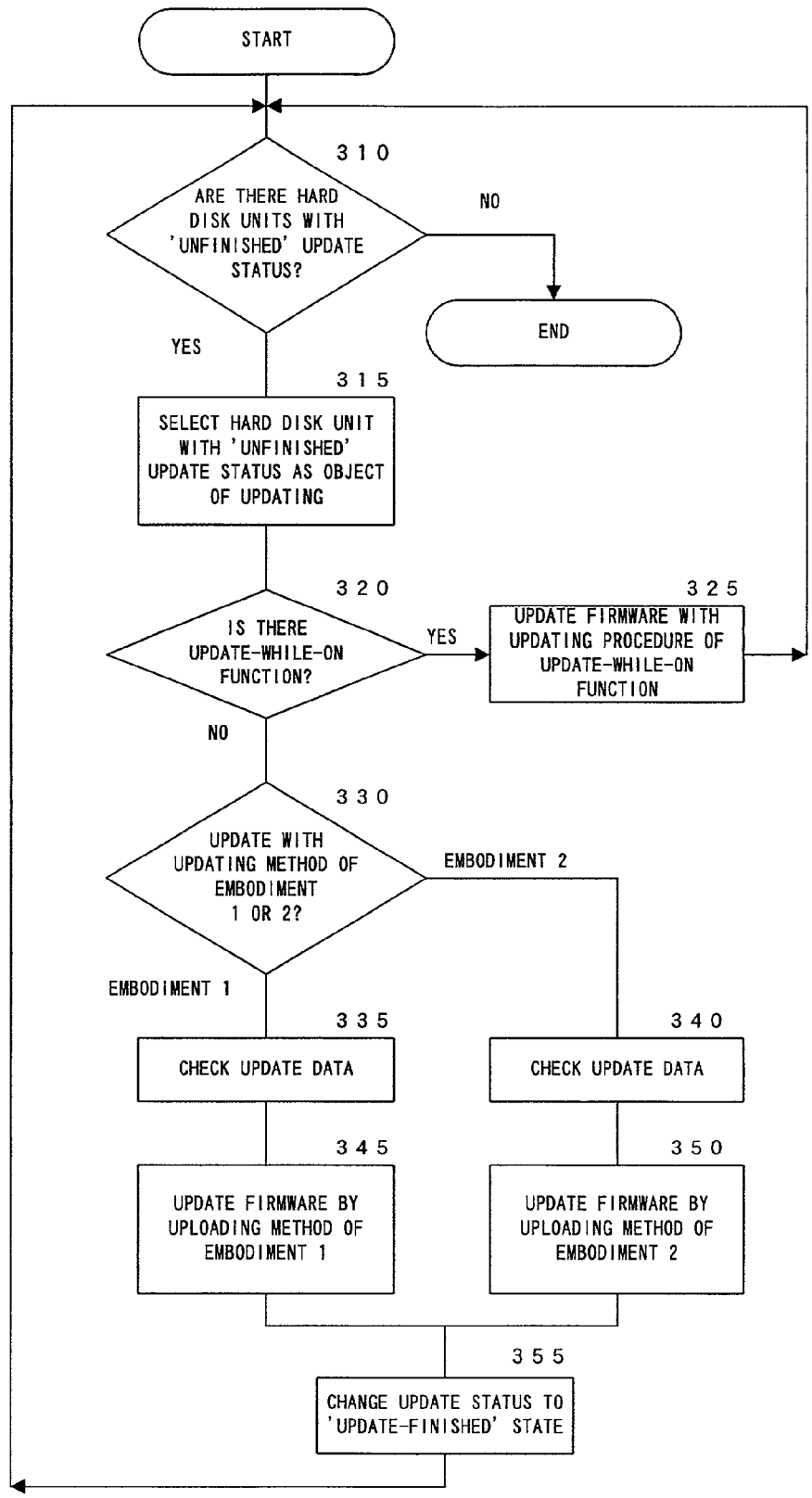
FIG. 5 is diagram showing a flowchart explaining an updating method of firmware according to Embodiment 3 of the present invention.

The flowchart shown in FIG. 5 is an updating method of Embodiment 3 of the present invention which was planned in view of the above requirements for performing firmware updating to the plurality of hard disk units 15 in one sequence, and FIG. 6 shows a management table which is to be appropriately referred to by an updating software, which performs the updating method of Embodiment 3, when the software is running.

The management table is registered and managed by the operator of the disk array device by the management terminal 17, and is stored by a memory group 13 of the disk array device. The table is inscribed with information such as an ID of a hard disk unit 15 which is identified by a slot number of the hard disk unit 15 mounted on the disk array device, necessity of updating of the firmware, whether or not there is an update-while-ON function, type of update data of the firmware, an update status showing whether updating of the firmware has been carried out or not, and an operating mode. The operating mode is information utilized for determining whether the firmware of the hard disk unit 15 is to be updated by either the method of the above Embodiment 1 or 2. As for the operating mode, there is also inscribed whether or not the hard disk unit 15 structures a RAID. If the disk unit structures a RAID, the RAID level of the hard disk unit is also inscribed. Note that in this embodiment, when the hard disk unit 15, which becomes the object, structures RAID 2 to 5, the updating of the firmware by the updating method in Embodiment 2 is performed. In any other case, the firmware is updated by the updating method of Embodiment 1.

The updating method of Embodiment 3 will be explained referring to FIGS. 5 and 6. First, the updating software refers to the management table which is stored in the disk array device, and checks to see whether or not there is a hard disk unit 15 with an update status in an unfinished state among the hard disk units 15 which has the necessity of being updated (310), and if there is such a hard disk unit 15, the hard disk unit 15 is selected as a hard disk unit A to be the object of updating (315). Next, the updating program checks the management table for whether or not the hard disk unit A has the update-while-ON function (320), and if it does have the update-while-ON function, the update process of the firmware of the hard disk unit A is performed according to the firmware update procedures by the update-while-ON function (325).

On the other hand, when the hard disk unit A does not have the update-while-ON function, the updating program next checks the management table for the operation mode designated by the hard disk unit A, and according to the operation state, it is determined whether updating will be performed by the updating method of either Embodiment 1 or 2 (330). When the operation state is determined, next, the updating program checks the management table for the designated update data of the hard disk unit A (335, 340), and starts the updating of the firmware of the hard disk unit A with this update data (345, 350). Next, when the updating of the firmware of the hard disk unit A is complete, the contents of the update status of the hard disk unit A in the management table is changed to an update-finished state (355). Then, the updating program again returns to the process of 310, and repeatedly performs the above processes until there is no hard disk unit 15 in the management table with an update status in an unfinished state.

By the way, in the above-described Embodiment 3, the updating of the firmware of the hard disk units is performed one by one in order. By performing the updating simultaneously in parallel, updating of the firmware may be performed more efficiently and faster. However, when the hard disk unit 15 is operating in RAID 2 to 5, a plurality of hard disk units structuring a certain RAID cannot be updated simultaneously in parallel. Therefore, when firmware is updated simultaneously in parallel, it is necessary to take into consideration that firmware updating of hard disk units 15 structuring the same RAID is not performed simultaneously in parallel.

Accordingly in this case, for example, as shown in FIG. 6, the IDs of RAIDs structured by the respective hard disk units 15 are described in the above management table, and when firmware of a certain hard disk unit 15 is to be updated, confirmation is made so that firmware updating of a hard disk unit 15 structuring the same RAID as the certain hard disk unit 15 is not being performed, and then the updating of the firmware to the certain hard disk unit 15 is started.

Consequently, according to the present invention, the firmware of the hard disk unit A may be updated without interrupting the function of the disk array device.

Although the preferred embodiment of the present invention has been described in detail, it should be understood that various changes, substitutions and alternations can be made therein without departing from spirit and scope of the inventions as defined by the appended claims.

What is claimed is:

1. An updating method of firmware stored in a non-volatile memory,
   said updating method being applicable to a disk array device which is mounted with a plurality of hard disk units, each comprising a mechanical section having a disk and a head, and an electronic circuit section having control functions and signal process functions of the mechanical section, an external interface function of a predetermined standard, and said non-volatile memory, said disk array storing, into said hard disk units, data received from another device via a communication means,
   said updating method comprising:
      a step for copying data recorded in a disk of a hard disk unit A to another hard disk unit B, the hard disk unit A having firmware that is to be updated;
      a step for stopping an I/O process performed to said hard disk unit A after said copying, and switching to an operation in a proxy mode in which said hard disk unit B performs the I/O process to the hard disk unit A in place of the hard disk unit A;
      a history management step for storing a data-modification history due to said I/O process during operation in said proxy mode;
      a step for updating the firmware of the hard disk unit A during operation in said proxy mode;
      a step for operating the hard disk unit A with the firmware having been updated;
      a step for setting up contents of the disk of the hard disk unit A, which has started operation with the new firmware, to a latest updated state by said modification history and data recorded in a disk of the hard disk unit A or B; and
      a step for stopping the operation in said proxy mode after completion of said set-up, and switching to an operation in a normal mode in which said I/O process is directly performed to the hard disk unit A.

2. An updating method of firmware according to claim 1, wherein updating of firmware of a plurality of said hard disk units mounted on said disk array device is to be performed automatically in one sequence.

3. A disk array device comprising a function of performing an updating method according to claim 2.

4. An updating method of firmware according to claim 1, wherein updating of firmware of at least two of said hard disk units is performed concurrently.

5. A disk array device comprising a function of performing an updating method according to claim 4.

6. An updating method of firmware according to claim 1, wherein if said hard disk unit A belongs to a RAID group, then said updating of firmware of said hard disk A is performed after confirming that updating is not being performed on firmware of another hard disk unit in said RAID group.

7. A disk array device comprising a function of performing an updating method according to claim 6.

8. A disk array device comprising a function of performing an updating method according to claim 1.

9. An updating method of firmware stored in a non-volatile memory,
   said updating method being applicable to a disk array device which is mounted with a plurality of hard disk units, each hard disk comprising a mechanical section including a disk and a head, and an electronic circuit section having control functions and signal process functions of the mechanical section, an external interface function of a predetermined standard, and said non-volatile memory, each hard disk being comprising means for storing data in accordance with a RAID 2 to 5, said data being received from another device which via a communication means,
   said updating method comprising:
      a step for stopping an I/O process performed to a hard disk unit A whose firmware is to be updated, and switching the I/O process performed to the hard disk unit A to an operation in a proxy mode performed by utilizing data of the hard disk unit A restored by data-restoration information which is stored in one or more disks of another hard disk unit group B structuring a RAID together with the hard disk unit A;
      a history management step for storing a data-modification history due to said I/O process during operation of said proxy mode;
      a step for updating the firmware of the hard disk unit A during operation in said proxy mode;
      a step for operating the hard disk unit A with the firmware having been updated;
      a step for setting up contents of the disk of the hard disk unit A, which has started operation with the new firmware, to a latest updated state by said modification history and said data-restoration information; and a step for stopping the operation in said proxy mode after said set up is complete, and switching to an operation in a normal mode in which said I/O process is directly performed to the hard disk unit A.

10. An updating method of firmware according to claim 9, wherein updating of firmware of a plurality of said hard disk units mounted on said disk array device is to be performed automatically in one sequence.

11. A disk array device comprising a function of performing an updating method according to claim 10.

12. An updating method of firmware according to claim 9, wherein updating of firmware of a plurality of said hard disk units mounted on the disk array device is to be performed simultaneously in parallel.

13. A disk array device comprising a function of performing an updating method according to claim 12.

14. An updating method of firmware according to claim 9, wherein said updating of firmware of said hard disk A is performed after confirming that updating is not being performed on firmware of another hard disk unit in said RAID group.

15. A disk array device comprising a function of performing an updating method according to claim 14.

16. A disk array device comprising a function of performing an updating method according to claim 9.

* * * * *